United States Patent
Woo et al.

(10) Patent No.: US 10,447,965 B2
(45) Date of Patent: Oct. 15, 2019

(54) APPARATUS AND METHOD FOR PROCESSING IMAGE

(71) Applicant: 39degrees C Inc., Seoul (KR)

(72) Inventors: Seung Won Woo, Seoul (KR); Hyun Goo Park, Seoul (KR)

(73) Assignee: 39DEGREES C INC., Seoul (KR)

( * ) Notice: Subject to any disclaimer, the term of this patent is extended or adjusted under 35 U.S.C. 154(b) by 0 days.

(21) Appl. No.: 16/012,237

(22) Filed: Jun. 19, 2018

(65) Prior Publication Data

US 2018/0302593 A1 Oct. 18, 2018

Related U.S. Application Data

(63) Continuation-in-part of application No. 15/333,838, filed on Oct. 25, 2016.

(30) Foreign Application Priority Data

Oct. 4, 2016 (KR) .................. 10-2016-0127802
Mar. 15, 2018 (KR) .................. 10-2018-0030414

(51) Int. Cl.
*H04N 5/222* (2006.01)
*H04N 5/232* (2006.01)
(Continued)

(52) U.S. Cl.
CPC ......... *H04N 7/0127* (2013.01); *G06F 1/1626* (2013.01); *G06F 3/0481* (2013.01);
(Continued)

(58) Field of Classification Search
CPC ... H04H 20/08; H04W 88/04; H04N 21/2343; H04L 29/06489; H04L 29/06496
See application file for complete search history.

(56) References Cited

U.S. PATENT DOCUMENTS 8,693,848 B1 * 4/2014 Pacor ............... H04N 21/21805
386/296
10,171,794 B2 1/2019 Matsunobu et al.
(Continued)

FOREIGN PATENT DOCUMENTS

JP 2013162348 A 8/2013
KR 10-1999-0050413 S 7/1999
(Continued)

*Primary Examiner* — Sinh Tran
*Assistant Examiner* — Selam T Gebriel
(74) *Attorney, Agent, or Firm* — Novick, Kim & Lee; Jae Youn Kim

(57) ABSTRACT

The image processing apparatus includes a shooting unit configured to capture a moving picture including video data and audio data of a subject at a certain location; a receiver configured to receive video data of a moving picture of the subject without audio data of the moving picture; a layer generator configured to generate a first layer and at least one second layer to reproduce and display on the screen a plurality of pieces of video data including the video data captured by the shooting unit and at least one piece of video data received by the receiver; a display controller configured to reproduce and display the first layer and the at least one second layer to be overlaid with each other on one screen through hierarchical combining.

7 Claims, 11 Drawing Sheets

(51) Int. Cl.
  *H04N 7/01*  (2006.01)
  *G06F 3/0481*  (2013.01)
  *G06F 3/0484*  (2013.01)
  *G06T 1/00*  (2006.01)
  *G06F 1/16*  (2006.01)
  *H04N 1/00*  (2006.01)
  *G06F 3/0488*  (2013.01)
(52) U.S. Cl.
  CPC ...... *G06F 3/04842* (2013.01); *G06F 3/04883* (2013.01); *G06T 1/0021* (2013.01); *H04N 1/00283* (2013.01)

(56) References Cited

U.S. PATENT DOCUMENTS

| | | |
|---|---|---|
| 10,200,597 B2 | 2/2019 | Choi et al. |
| 2006/0280496 A1 | 12/2006 | Tanoue |
| 2009/0136222 A1 | 5/2009 | Lee |
| 2015/0195601 A1 | 7/2015 | Hahm |
| 2015/0234576 A1 | 8/2015 | Bae et al. |
| 2015/0242983 A1 | 8/2015 | Digiovanni |

FOREIGN PATENT DOCUMENTS

| | | |
|---|---|---|
| KR | 10-2014-0073372 A | 6/2014 |
| KR | 20140093557 A | 7/2014 |
| KR | 10-2015-0082949 A | 7/2015 |
| KR | 10-2015-0096956 A | 8/2015 |

\* cited by examiner

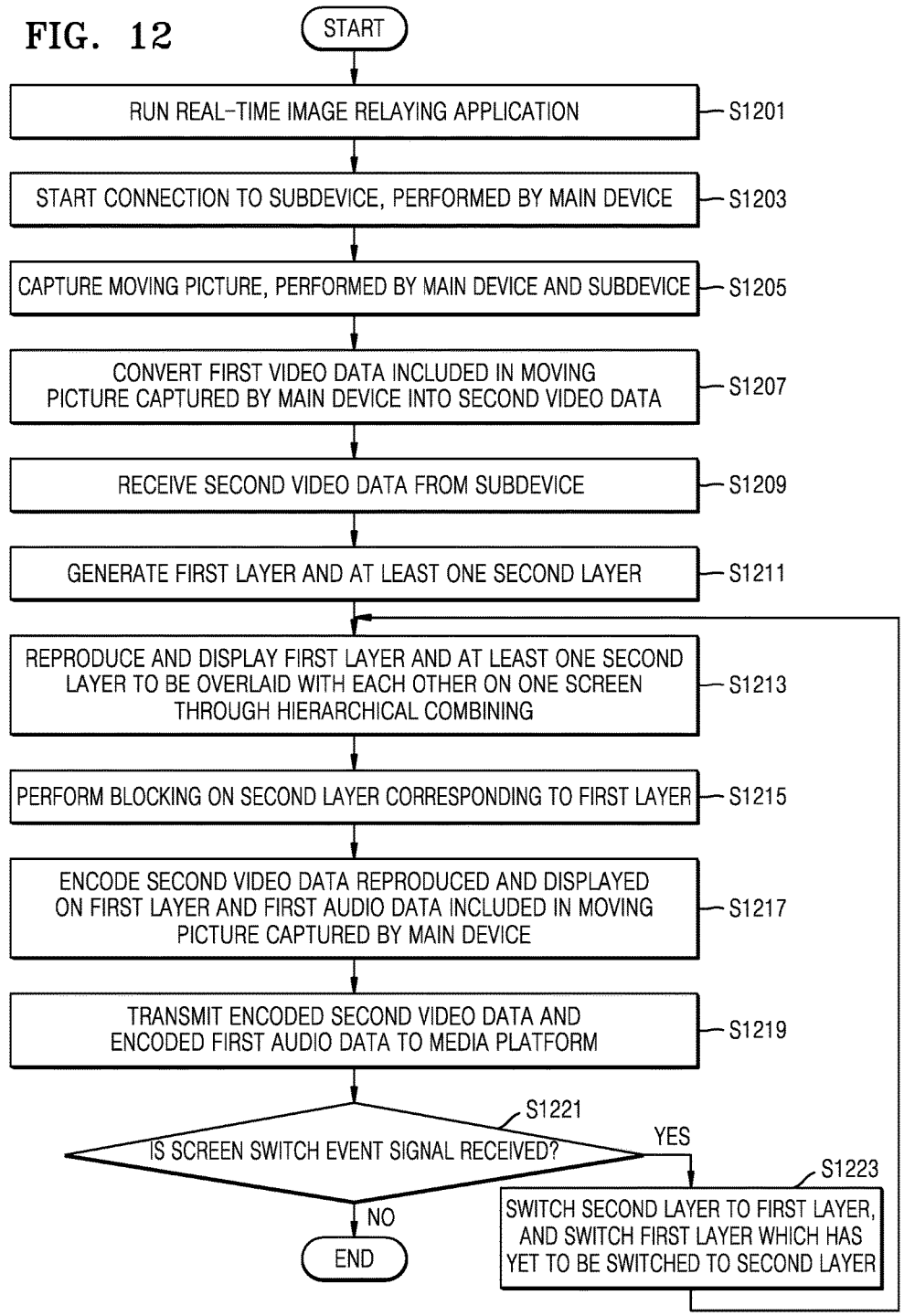

APPARATUS AND METHOD FOR PROCESSING IMAGE

CROSS-REFERENCE TO RELATED APPLICATION

This is a CIP of U.S. application Ser. No. 15/333,838 filed Oct. 25, 2016, which claims the benefit of Korean Patent Application No. 10-2016-0127802 filed on Oct. 4, 2016. This CIP application also claims the priority to and benefit of Korean Patent Application No. 10-2018-0030414 filed on Mar. 15, 2018, in the Korean Intellectual Property Office, the disclosure of which is incorporated herein in its entirety by reference.

BACKGROUND

1. Field

One or more embodiments relate to an apparatus and method for processing an image.

2. Description of the Related Art

With advancements in technology, mobile devices supporting various multimedia functions have continuously evolved and been improved in terms of performance. As the performance of mobile devices has been improved, video can be compressed and transmitted in real time to an external device. Owing to the features of mobile devices that users can carry anywhere and at any time, content can be captured and transmitted in real time and thus, such mobile devices have been applied in various fields.

Information disclosed in this Background section was already known to the inventors before achieving the inventive concept or is technical information acquired in the process of achieving the inventive concept. Therefore, it may contain information that does not form the prior art that is already known to the public in this country.

SUMMARY

One or more embodiments are directed to transmitting video data and audio data captured by multiple devices to a media platform in real time without delay so that the media platform may reproduce the video data and the audio data in real time.

One or more embodiments are directed to transmitting a video signal captured by a subdevice among multiple devices to a main device without delay and without using a router.

One or more embodiments are directed to displaying video signals captured by a main device and a subdevice on a display region of the main device in real time.

One or more embodiments are directed to reproducing video data and audio data in real time on a media platform by relaying video data and audio data captured by a main device in real time to the media platform while continuously capturing a moving picture by turning on a camera of the main device, even when video data cannot be received from a subdevice due to an error occurring in a communication network.

Additional aspects will be set forth in part in the description which follows and, in part, will be apparent from the description, or may be learned by practice of the presented embodiments.

According to an aspect of an embodiment, an apparatus for processing an image includes a shooting unit configured to capture a moving picture including video data and audio data of a subject at a certain location; a receiver configured to receive video data of a moving picture of the subject except audio data of the moving picture, the moving picture being captured by at least one subdevice at the same shooting start time as the shooting unit and at one or more locations different from a shooting location of the shooting unit; a layer generator configured to generate a first layer and at least one second layer to reproduce and display on a screen a plurality of pieces of video data including the video data captured by the shooting unit and at least one piece of video data received by the receiver, wherein the first layer is configured to transmit one of the plurality of pieces of video data to the screen, and the at least one second layer is configured to transmit the plurality of pieces of video data to a part of the screen; a display controller configured to reproduce and display the first layer and the at least one second layer to be overlaid with each other on one screen by hierarchical combination; and a transmitter configured to transmit the video data reproduced and displayed on the first layer and the audio data included in the moving picture captured by the shooting unit to the outside.

The apparatus may further include a layer switcher configured to switch the second layer to the first layer and switch the first layer before being switched to the second layer when a screen switch event signal regarding one of the at least one second layer is received.

The capturing of the moving picture by the shooting unit may be continuously performed.

According to an aspect of another embodiment, a method of processing an image includes capturing a moving picture including video data and audio data of a subject at a certain location, which is performed by a shooting unit; receiving video data of a moving picture of the subject except audio data of the moving picture, the moving picture being captured by at least one subdevice at the same shooting start time as the shooting unit and one or more locations different from a shooting location of the shooting unit, which is performed by a receiver; generating a first layer and at least one second layer to reproduce and display on the screen a plurality of pieces of video data including the video data captured by the shooting unit and at least one piece of video data received by the receiver, which is performed by a layer generator, wherein the first layer is configured to transmit one of the plurality of pieces of video data to the screen, and the at least one second layer is configured to transmit the plurality of pieces of video data to a part of the screen; reproducing and displaying the first layer and the at least one second layer to be overlaid with each other on one screen through hierarchical combining, which is performed by a display controller; and transmitting the video data reproduced and displayed on the first layer and the audio data included in the moving picture captured by the shooting unit to the outside, which is performed by a transmitter.

The method may further include switching the second layer to the first layer and switching the first layer which has yet to be switched to the second layer, which is performed by a layer switcher, when a screen switch event signal regarding one of the at least one second layer is received.

The method may further include continuously performing the capturing of the moving picture by the shooting unit.

According to one or more embodiments, there are provided other methods, systems, and a computer program configured to perform the methods.

BRIEF DESCRIPTION OF THE DRAWINGS

These and/or other aspects will become apparent and more readily appreciated from the following description of the embodiments, taken in conjunction with the accompanying drawings in which:

FIG. 12 is a flowchart of a method of processing an image, according to another embodiment.

DETAILED DESCRIPTION

Figure 1:
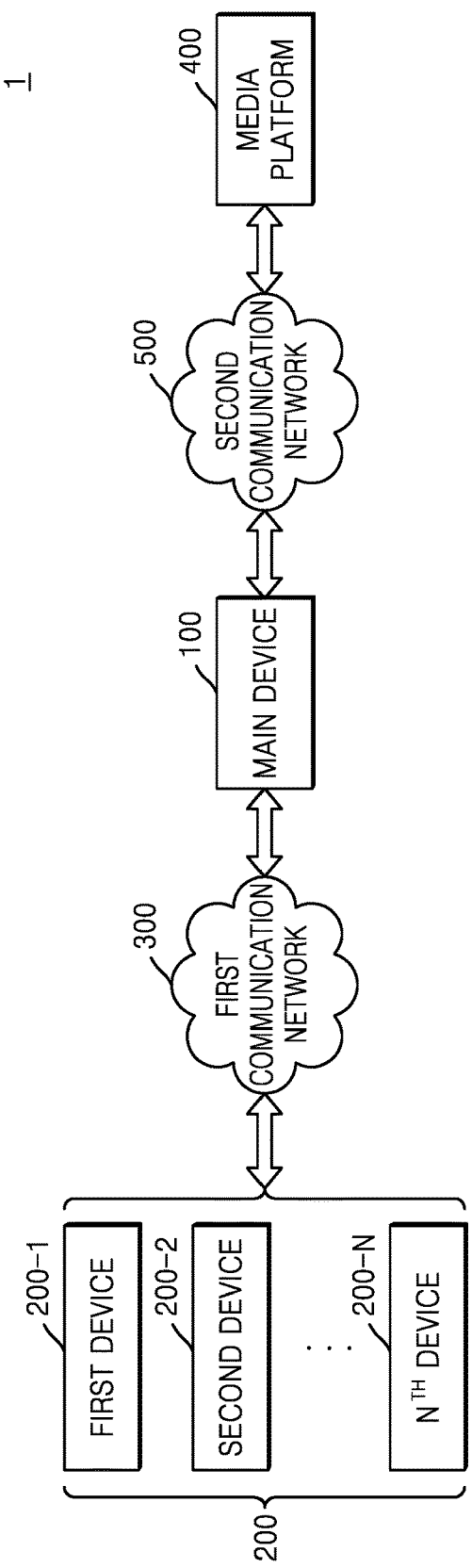
FIG. 1 is a diagram schematically illustrating an image processing system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The advantages and features of the inventive concept and a method of achieving them would be apparent from the following embodiments in conjunction with the accompanying drawings. However, the inventive concept is not limited to these embodiments, and may be embodied in many different forms and should be understood to cover all modifications, equivalents, and alternatives falling within the scope of the inventive concept. The following embodiments are provided so that this disclosure will be thorough and complete and will fully convey the inventive concept to those of ordinary skill in the art. In the following description, well-known technologies are not described in detail if it is determined that they would obscure the inventive concept due to unnecessary detail.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that, although the terms "first", "second", "third", etc., may be used herein to describe various elements, these elements should not be limited by these terms. These terms are only used to distinguish one element from another element.

In the present disclosure, the term "main device" (see reference numeral "100" of FIG. 1) should be understood to include a terminal having a function of capturing moving pictures, including video data and audio data. Examples of the main device may include a mobile device manipulated by a user, such as a notebook computer, a handheld device, a smart phone, a tablet personal computer (PC), etc., a desktop computer, and any appropriate device using such a device or connected directly or indirectly to such a device. However, the main device is not limited thereto and any terminal having a web browsing function and a video capturing function may be employed as the main device without limitation. In the following embodiments, the main device may be, for example, a mobile terminal capable of running a real-time image relaying application. The main device may serve as a repeater which transmits an image captured by the main device itself and/or an image received from a subdevice to a media platform.

In the present disclosure, the term "subdevice" (see reference numeral "200" of FIG. 1) should be understood to include at least one terminal connected to the main device and having a function of capturing moving pictures, including video data and audio data. The subdevice may transmit video data converted to a predetermined format to the main device. Examples of the subdevice may include a mobile device manipulated by a user, such as a notebook computer, a handheld device, a smart phone, a tablet PC, etc., a desktop computer, and any appropriate device using such a device or connected directly or indirectly to such a device. However, the subdevice is not limited thereto and any terminal having a web browsing function and a video capturing function as described above may be employed as the subdevice without limitation. In the following embodiments, the subdevice may be, for example, a mobile terminal capable of running a real-time image relaying application.

Hereinafter, embodiments will be described in detail with reference to the accompanying drawings, in which the same elements or corresponding elements are assigned the same reference numerals and are not redundantly described here.

FIG. 1 is a diagram schematically illustrating an image processing system 1 according to an embodiment. Referring to FIG. 1, the image processing system 1 may include a main device 100, a subdevice 200, a first communication network 300, a media platform 400, and a second communication network 500. The subdevice 200 may include a first device 200-1 to an $N^{th}$ device 200-N.

The main device 100 may detect the first to $N^{th}$ devices 200-1 to 200-N which are within a communication radius of the first communication network 300 as the subdevice 200, and transmit a signal requesting connection to the main device 100 to the detected first to $N^{th}$ devices 200-1 to 200-N. When receiving a signal permitting connection to the main device 100 from one of the first to $N^{th}$ devices 200-1 to 200-N, the main device 100 may start connection to the device transmitting the signal permitting connection to the main device 100. Here, the main device 100 may set the media platform 400 as an external device to which a moving picture (including second video data and first audio data) is transmitted in real time during the detecting of the first to $N^{th}$ devices 200-1 to 200-N or while starting the connection.

When the main device 100 completes the starting of the connection, a shooting start signal is generated and transmitted to the first to $N^{th}$ devices 200-1 to 200-N. Thus, a same shooting start time may be recorded on the main device 100 and the first to $N^{th}$ devices 200-1 to 200-N.

The main device 100 may capture moving pictures of a subject, including first audio data and first video data, at a predetermined location in real time. The first video data may be captured by a charge-coupled device (CCD) (not shown) and the first audio data may be recorded by an internal microphone (not shown).

The main device 100 may convert the first video data captured in real time into the second video data. Here, the first video data may be raw data which is non-processed data containing data processed to a minimum level by a CCD (not shown) included in the main device 100. In general, the raw data is not compressed or is losslessly compressed, and white balance, brightness, tone, chroma, etc. of the raw data are not determined. The raw data includes only information sensed by an image sensor. The second video data may include video data obtained by converting the first video data to a predetermined format. The second video data may include a bitmap format. Here, the second video data is not limited to the bitmap format, and may include an image format such as a joint photographic expert group (JPEG) format, a graphics interchange format (GIF), a portable network graphics (PNG) format, or the like.

The main device 100 may display the second video data converted from the first video data by the main device 100 itself on a first display region, and display one or more pieces of second video data received from the subdevice 200 on a second display region. The second display region is different from the first display region and is divided into one or more subregions. In general, the main device 100 encodes and decodes the first video data and the first audio data transmitted from the subdevice 200 and displays a result of encoding and decoding the first video data and the first audio data on a display region. Thus, it takes time to encode and decode the first video data and the first audio data. This time may be a major cause of delays in real-time broadcasting. Furthermore, moving pictures cannot be reproduced in real time at the media platform 400 due to this time. However, in the present embodiment, the second video data is received from the subdevice 200 and displayed on the second display region without being encoded and decoded. Thus, moving pictures may be processed in real time and be thus reproduced in real time at the media platform 400.

The main device 100 may switch the second video data, which is received from the subdevice 200 and displayed on a subregion selected according to a request to select one subregion, to be displayed on the first display region. Thus, the second video data captured by the main device 100 or the second video data received from the subdevice 200 may be displayed on the first display region. Furthermore, both the second video data displayed on the first display region and the second video data displayed on the second display region may include video data captured in real time and converted.

In an alternative embodiment, in order to reproduce and display on one screen a plurality of pieces of second video data including second video data captured by the main device 100 and one or more pieces of second video data received from the subdevice 200, the main device 100 may generate a first layer (surface) for displaying one of the plurality of pieces of second video data to the screen and at least one second layer for displaying the plurality of pieces of second video data to a part of the screen, reproduce and display the first layer and the at least one second layer to be overlaid with each other on the screen through hierarchical combining, and perform blocking on a second layer corresponding to the first layer. Here, the performing of the blocking on the second layer may be understood as processing the second layer to be transparent so that a hidden portion of the first layer corresponding to the second layer may be visualized.

Conventionally, when one or more pieces of second video data are received from the subdevice 200, the main device 100 performs hardware coding on the one or more pieces of second video data and displays the coded second video data on the main device 100. Thus, a video capturing function of the main device 100, i.e., an operation of a CCD thereof, is discontinued in the process. In contrast, in the present embodiment, the main device 100 does not additionally perform hardware coding, but performs software coding, and reproduces and displays one or more pieces of second video data received from the subdevice 200 by generating a plurality of independent layers. Thus, the video capturing function of the main device 100, i.e., the operation of the CCD, may be continuously performed.

As described above, the main device 100 generates a plurality of layers and the CCD of the main device 100 is turned on to continuously capture a moving picture while reproducing and displaying one or more pieces of second video data from the subdevice 200. Thus, even if second video data cannot be received from the subdevice 200 due to an error occurring in the first communication network 300, second video data and first audio data captured by the main device 100 may be relayed in real time to the media platform 400 and thus may be reproduced in real time at the media platform 400.

When a screen switch event signal regarding a second layer among the at least one second layer reproduced and displayed on the screen is received, the main device 100 may switch the second layer to the first layer, switch the first layer which has yet to be switched to the second layer, synthesize the first layer and the at least one second layer into one screen after performing switching through hierarchical combining and reproduce and display the synthesized layer, and perform blocking on the second layer corresponding to the first layer after the switching. Here, the performing of the blocking on the second layer may be understood as processing the second layer to be transparent so that a hidden portion of the first layer corresponding to the second layer may be visualized.

The main device 100 may insert a watermark received from a user into the second video data displayed on the first display region. Alternatively, the main device 100 may insert the watermark received from the user into the second video data reproduced and displayed on the first layer. Here, the watermark may include various graphic elements such as an image, subtitles, a visual effect, etc. The main device 100 may provide an additional user interface to insert the watermark into the first display region of a first layer.

The main device 100 may encode the second video data displayed on the first display region and the first audio data. Alternatively, the main device 100 may encode the second video data and the first audio data reproduced and displayed on the first layer. The main device 100 may transmit a moving picture, including the encoded second video data and first audio data, to the media platform 400 which is an external device. Here, the main device 100 may transmit the encoded second video data and first audio data to the media platform 400 according to a real time messaging protocol (RTMP) which is a communication protocol.

The subdevice 200 may be connected to the main device 100 via the first communication network 300, and may capture a moving picture of a subject, which includes first audio data and first video data, in real time at at least one location which is the same as or different from a location where the main device 100 photographs the subject.

The subdevice 200 may communicate with the main device 100 within a communication radius of the first communication network 300, transmit a connection permitting message to the main device 100 when receiving a connection request signal from the main device 100, and start capturing a moving picture when receiving a shooting start signal from the main device 100.

The subdevice 200 may convert first video data of a captured moving picture into second video data and transmit the second video data to the main device 100. Here, first audio data recorded by the subdevice 200 is not transmitted to the main device 100, and only the second video data may be transmitted to the main device 100.

The first communication network 300 may enable exchange of data between the main device 100 and the subdevice 200. The first communication network 300 may be understood as a communication network providing a connection path to exchange data between the main device 100 and the subdevice 200 when the main device 100 and the subdevice 200 are connected to each other. Here, the first communication network 300 may include Wi-Fi direct. Wi-Fi direct may be understood as a communication network whereby device-to-device communication may be established between the main device 100 and the subdevice 200 even when not part of a home network, an office network, or a hotspot network. When Wi-Fi direct is used, communication may be established between the main device 100 and the subdevice 200 without using a router. In this case, a communication radius may be about 70 meters.

In general, a wireless local area network (LAN) mainly handles an operation of an infrastructure basic service set (BSS) in which a router serves as a hub. The router performs a function of supporting a physical layer for wireless/wired connection, a function of routing devices in a network, a function of providing a service to add a device to or remove a device from a network, etc. In this case, the devices in the network are connected to each other via the router without being directly connected to each other. However, in the present embodiment, communication may be directly established between the main device 100 and the subdevice 200 through Wi-Fi direct without using a router.

The media platform 400 may receive a moving picture (including second video data and first audio data) from the main device 100 via the second communication network 500, and reproduce the moving picture in real time. The media platform 400 may include, for example, a system providing a social network service (SNS) site where moving picture content is shared, e.g., Africa TV, YouTube, Facebook, etc.

The second communication network 500 connects the main device 100 and the media platform 400 to each other. That is, the second communication network 500 means a communication network providing a connection path in which the main device 100 is connected to the media platform 400 to transmit data to or receive data from the media platform 400. Examples of the second communication network 500 include wired networks such as LANs, Wide Area Networks (WANs), Metropolitan Area Networks (MANs), Integrated Service Digital Networks (ISDNs), etc., or wireless networks such as wireless LANs, CDMA, Bluetooth, satellite communication, etc., but the scope of the inventive concept is not limited thereto. In the present embodiment, the first communication network 300 and the second communication network 500 are differently embodied but the second communication network 500 may include the first communication network 300.

Figure 2:
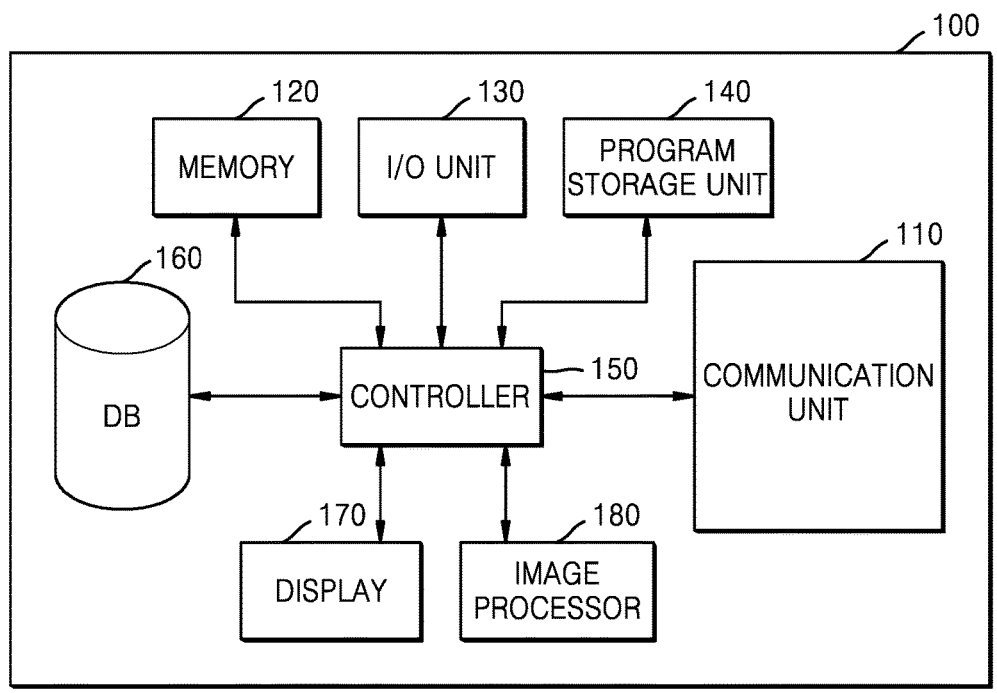
FIG. 2 is a schematic block diagram of a structure of a main device included in the image processing system of FIG. 1.

FIG. 2 is a schematic block diagram of a structure of the main device 100 included in the image processing system 1 of FIG. 1. Elements of FIG. 2 that are the same as those of FIG. 1 will not be redundantly described below. Referring to FIG. 2, the main device 100 may include a communication unit 110, a memory 120, an input/output (I/O) unit 130, a program storage unit 140, a controller 150, a database 160, a display 170, and an image processor 180.

The communication unit 110 may provide a communication interface needed to provide, in the form of packet data, a signal to be exchanged between the main device 100 and the subdevice 200 while being linked to the first communication network 300. The communication unit 110 may transmit a connection request signal to the first to $N^{th}$ devices 200-1 to 200-N included in the subdevice 200 which is within a first communication radius, receive a connection permission signal from the first to $N^{th}$ devices 200-1 to 200-N, generate a shooting start signal and transmit it to the first to $N^{th}$ devices 200-1 to 200-N, and receive second video data from the first to $N^{th}$ devices 200-1 to 200-N.

Furthermore, the communication unit 110 may provide a communication interface needed to provide, in the form of packet data, a signal to be exchanged between the main device 100 and the media platform 400 while being linked to the second communication network 500. The communication unit 110 may be connected to the media platform 400 to transmit the second video data and first audio data to the media platform 400 in real time.

The communication unit 110 may be a device including hardware and software needed to connect the communication unit 110 to another network device so as to transmit a signal, such as a control signal or a data signal, to the other network device or receive the signal from the other network device.

The memory 120 performs a function of temporarily or permanently storing data processed by the controller 150. In the present embodiment, the memory 120 may store second video data received from the subdevice 200, and a moving picture (including first video data and first audio data) captured by the main device 100. Here, the memory 120 may include a magnetic storage medium or a flash storage medium but the scope of the inventive concept is not limited thereto.

The I/O unit 130 may be embodied as a touch recognition display controller or other various I/O controllers. For example, the touch recognition display controller may provide an output interface and an input interface between a device and a user. The touch recognition display controller may transmit an electrical signal to or receive it from the controller 150. Furthermore, the touch recognition display controller may display a visual output and/or an audio output to a user. The visual output may include text, graphics, an image, video, or a combination thereof. The audio output may include audio which is in synchronization with the visual output. The I/O unit 130 may be, for example, a display member having a touch recognition function, such as an organic light-emitting display (OLED) or a liquid crystal display (LCD).

The program storage unit 140 includes control software for performing detecting of the subdevice 200 in a first wireless communication environment, transmitting a connection request signal to the subdevice 200, receiving the connection permission signal from the subdevice 200, transmitting a shooting start signal to the subdevice 200, receiving a second video signal from the subdevice 200, converting the first video data captured by the main device 100 into second video data, displaying on a display region the second video data and second video data received from the subdevice 200, generating a plurality of layers, reproducing and displaying the second video data and the second video data received from the subdevice 200 by transmitting the second video data to the plurality of layers, inserting a watermark into the second video data, encoding the second video data and the first audio data, transmitting the second video data and the first audio data to the media platform 400, etc.

The controller 150 is a type of central processing unit (CPU), and may control a whole process of transmitting, to the media platform 400, either the second video data received from the subdevice 200 or the second video data converted from the first video data included in the moving picture captured by the main device 100, and the first audio data included in the moving picture captured by the main device 100. As described above, the controller 150 may control a whole processing process related to exchange of data among the main device 100, the subdevice 200, and the media platform 400.

The database 160 may include information regarding a user and a device using the main device 100 and the subdevice 200 in relation to a real-time image relaying application installed in the main device 100 and the subdevice 200.

The display 170 may reproduce the moving picture which is being captured by the main device 100, i.e., the, first video data and the first audio data. The display 170 may be, for example, a display member having a touch recognition function, such as an OLED or an LCD. The display 170 may include a first display region and a second display region. The second video data received from the subdevice 200 may be displayed on the second display region. The second display region may be divided into one or more subregions. The number of the one or more subregions may be the same as the number of the first to $N^{th}$ devices 200-1 to 200-N which transmit the connection permission signal. Furthermore, the display 170 may include a first layer and at least one second layer for reproducing and displaying a plurality of pieces of second video data on one screen. The second video data captured by the main device 100 and the second video data received from the subdevice 200 may be reproduced and displayed on the at least one second layer. The number of the at least one second layer may be equal to the sum of the number of the first to $N^{th}$ devices 200-1 to 200-N transmitting the connection permission signal and the number of the main device 100. The sum of the number of the first layer and the number of the at least one second layer may be greater by 1 than the sum of the number of the first to $N^{th}$ devices 200-1 to 200-N transmitting the connection permission signal and the number of the main device 100. The display 170 may display a user interface on the second video data displayed on the first display region or the first layer, through which a watermark may be inserted, and may display on the first display region a status of inserting the watermark.

The image processor 180 may start connection to the subdevice 200 by detecting the first to $N^{th}$ devices 200-1 to 200-N included in the subdevice 200 which is in a communication radius of the first communication network 300. The image processor 180 may capture a moving picture (including first audio data and first video data) of a subject at a location in real time, and convert the first video data into second video data. The image processor 180 may display the second video data converted from the first video data on the first display region, and display one or more pieces of second video data received from the subdevice 200 on the second display region which is different from the first display region and which is divided into one or more subregions. The image processor 180 may switch the second video data, which is received from the subdevice 200 and displayed on a subregion selected according to a request to select one subregion, to be displayed on the first display region.

In an alternative embodiment, the image processor 180 may generate a first layer and at least one second layer. In order to reproduce and display on one screen a plurality of pieces of second video data including second video data captured by the main device 100 and one or more pieces of second video data received from the subdevice 200, the image processor 180 may transmit one of the plurality of pieces of second video data to the first layer and the plurality of pieces of second video data to each of the at least one second layer. The image processor 180 may reproduce and display the first layer and the at least one second layer to be overlaid with each other on one screen through hierarchical combining, and perform blocking on a second layer corresponding to the first layer. When a screen switch event signal regarding the first layer and one of the at least one second layer reproduced and displayed on the display 170 of the main device 100 is received, the image processor 180 may switch the second layer to the first layer, switch the first layer which has yet to be switched to the second layer, synthesize, reproduce and display the first layer and the at least one second layer as one screen after performing switching through hierarchical combining, and perform blocking on the second layer corresponding to the first layer after the performing of the switching.

The image processor 180 may insert a watermark received from a user into the second video data displayed on the first display region or the first layer. The image processor 180 may encode the second video data displayed on the first display region or the first layer and the first audio data, and transmit a moving picture including the encoded second video data and first audio data to the media platform 400 according to the RTMP.

Figure 3:
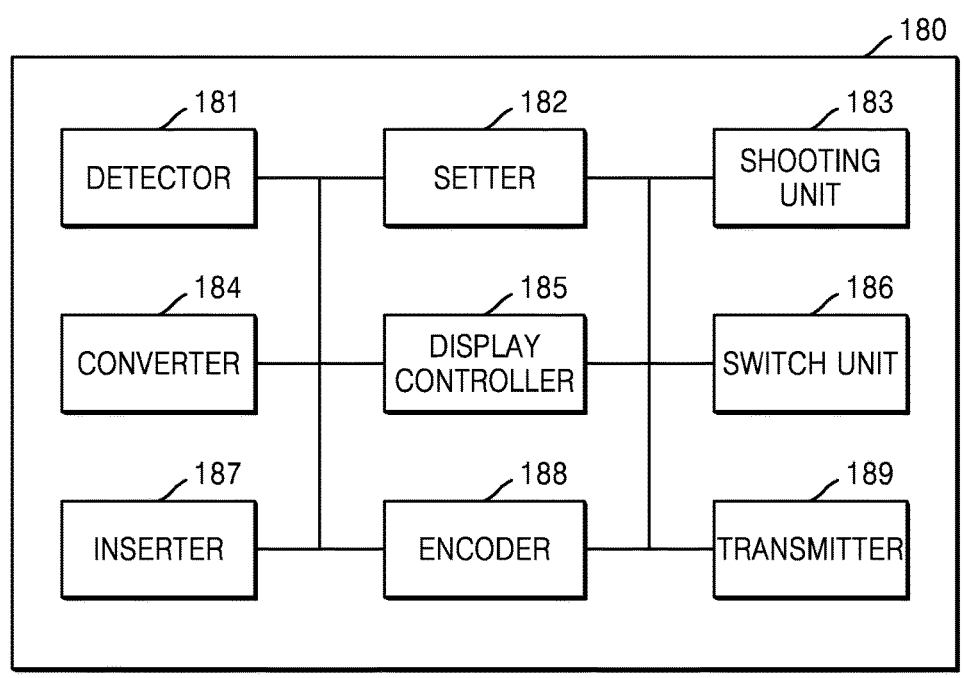
FIG. 3 is a schematic block diagram of a structure of an image processor of the main device of FIG. 2.

FIG. 3 is a schematic block diagram of a structure of the image processor 180 of the main device 100 of FIG. 2. Elements of FIG. 3 that are the same as those of FIGS. 1 and 2 will not be redundantly described here. Referring to FIG. 3, the image processor 180 may include a detector 181, a setter 182, a shooting unit 183, a converter 184, a display controller 185, a switch unit 186, an inserter 187, an encoder 188, and a transmitter 189.

The detector 181 may detect the first to $N^{th}$ devices 200-1 to 200-N which are within the communication radius of the first communication network 300 as the subdevice 200 and output a result of detecting the first to $N^{th}$ devices 200-1 to 200-N as the subdevice 200 to the display 170 when a signal requesting to detect the subdevice 200 is received from a user.

The setter 182 may check the result of detecting the first to $N^{th}$ devices 200-1 to 200-N included in the subdevice 200, select at least one among the first to $N^{th}$ devices 200-1 to 200-N, and transmit a connection request signal requesting to connect to the main device 100 to the selected at least one device. When receiving a connection permission signal from the selected at least one device to which the connection request signal is transmitted, the setter 182 may display the selected at least one device transmitting the connection permission signal on the display 170, and start connection to the main device 100 according to a selection signal with respect to the selected at least one device.

The setter 182 may set the media platform 400 as an external device to which a moving picture (including second video data and first audio data) is to be transmitted during the detecting of the first to $N^{th}$ devices 200-1 to 200-N included in the subdevice 200 or the starting of the connection to the main device 100. When the setter 182 completes setting of the starting of the connection to the main device 100, a shooting start signal may be generated and transmitted to the first to $N^{th}$ devices 200-1 to 200-N and thus the same shooting start time may be recorded on the main device 100 and the first to $N^{th}$ devices 200-1 to 200-N.

Although not shown, the shooting unit 183 may include a camera having a shutter, a series of lenses, an iris, and a CCD, an analog-to-digital converter (ADC), a microphone, etc. The shooting unit 183 may capture, through the shutter, a moving picture including first audio data and first video data of a subject at a location in real time. The shooting unit 183 may capture the first video data by using the CCD and record the first audio data by using the microphone.

The converter 184 may convert the first video data captured in real time into second video data. Here, the first video data may be raw data including data processed to a minimum level by the CCD included in the shooting unit 183. The second video data may include video data obtained by converting the first video data to a certain format, e.g., data which is in a bitmap format. Furthermore, the converter 184 may generate second video data by converting a frame rate and/or resolution of the first video data according to a control signal.

The display controller 185 may display on the display 170 the second video data converted from the first video data by the converter 184 and one or more pieces of second video data received in real time from the first to $N^{th}$ devices 200-1 to 200-N included in the subdevice 200.

Figure 4:
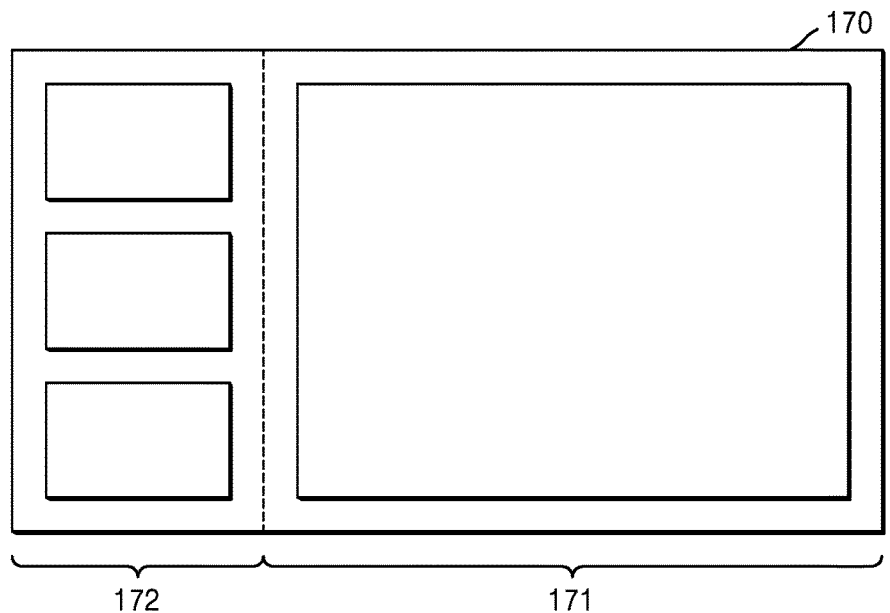
FIG. 4 is a diagram schematically illustrating a structure of a display included in the main device of FIG. 1.

FIG. 4 is a diagram schematically illustrating a structure of the display 170 included in the main device 100 of FIG. 1, according to an embodiment. FIG. 4 illustrates a structure of the display 170. Referring to FIG. 4, the display 170 may include a first display region 171 and a second display region 172. Here, the second display region 172 is divided into a plurality of subregions. The number of the plurality of subregions may be equal to that of the first to $N^{th}$ devices 200-1 to 200-N starting connection to the main device 100. The second display region 172 may be divided into the plurality of subregions at a point of time when a connection between the main device 100 and the first to $N^{th}$ devices 200-1 to 200-N is started by the display controller 185.

The display controller 185 may display the second video data converted from the first video data by the converter 184 on the first display region 171, and second video data received from the first to $N^{th}$ devices 200-1 to 200-N on the plurality of subsections of the second display region 172. Here, the second video signal displayed on the first display region 171 may be transmitted in real time to the media platform 400. A frame rate of the second video signal displayed on the first display region 171 may be different from that of the second video data displayed on each of the plurality of subregions of the second display region 172. For example, second video data of 30 frames per second may be displayed on the first display region 171, and second video data of 15 frames per second may be displayed on each of the plurality of subregions of the second display region 172. As illustrated in FIG. 4, since each of the plurality of subregions of the second display region 172 is smaller in size than the first display region 171, second video data of a lower frame rate may be displayed on each of the plurality of subregions of the second display region 172.

Since second video data received from the first to $N^{th}$ devices 200-1 to 200-N in real time is displayed on each of the plurality of subregions of the second display region 172, the display controller 185 may control the main device 100 to display second video data of 30 frames per second on the first display region 171 and control the first to $N^{th}$ devices 200-1 to 200-N to display second video data of 15 frames per second, simultaneously with transmission of a shooting start signal to the first to $N^{th}$ devices 200-1 to 200-N. Thus, the second video data of 15 frames per second received from the first to $N^{th}$ devices 200-1 to 200-N may be displayed on each of the plurality of subregions of the second display region 172.

Although the second video data displayed on the first display region 171 and the second video data displayed on each of the plurality of subregions of the second display region 172 are different from each other in terms of frame rate in the present embodiment, they may be different from each other in terms of resolution rather than frame rate. For example, the display controller 185 may display second video data having resolution of 1280×720 on the first display region 171, and second video data having resolution of 640×480 on each of the plurality of subregions of the second display region 172.

The switch unit 186 may switch the second video data, which is displayed on a subregion selected according to a request to select one subregion, received from a user, to be displayed on the first display region 171, in a state in which the second video data converted from the first video data by the converter 184 is displayed on the first display region 171 and the second video data received from the first to $N^{th}$ devices 200-1 to 200-N is displayed on each of the plurality of subregions of the second display region 172.

Here, when the second video data displayed on the subregion is switched to be displayed on the first display region 171, the switch unit 186 may transmit a control signal instructing to transmit second video data having a different frame rate to one of the first to $N^{th}$ devices 200-1 to 200-N which transmit the second video data to the plurality of subregions. That is, the switch unit 186 may transmit a control signal instructing to transmit second video data having a frame rate of 30 frames per second to one of the first to $N^{th}$ devices 200-1 to 200-N that transmitted second video data having a frame rate of 15 frames per second at a time of point when a subregion is selected.

Furthermore, the switch unit 186 switches second video data previously displayed on the first display region 171 to be displayed on one of the plurality of subregions of the second display region 172. In this case, the switch unit 186 may output a control signal instructing to output the second video data having a frame rate of 30 frames per second to be transmitted at a frame rate of 15 frames per second.

The inserter 187 may provide a user interface for inserting a watermark into second video data in a state in which the second video data is displayed on the first display region 171, and insert the watermark into the second video data displayed on the first display region 171 according to a user's selection. Here, the watermark may include various graphic elements such as an image, subtitles, a visual effect, etc.

The encoder 188 may encode the second video data displayed on the first display region 171 into a H.264 format and encode first audio data by using advanced audio coding (AAC). Here, even if only second video data is received from the subdevice 200 and displayed on the first display region 171, the same shooting start signal is recorded on the main device 100 and the subdevice 200. Thus, the second video data received from the subdevice 200 and the first audio data recorded by the main device 100 may be synchronous or almost synchronous with each other.

The transmitter 189 transmits encoded second video data displayed on the first display region 171 and encoded first audio data to the media platform 400 via the second communication network 500 using the RTMP. Thus, the media platform 400 may reproduce a moving picture (including the second video data and the first audio data) transmitted in real time from the main device 100.

Figure 5:
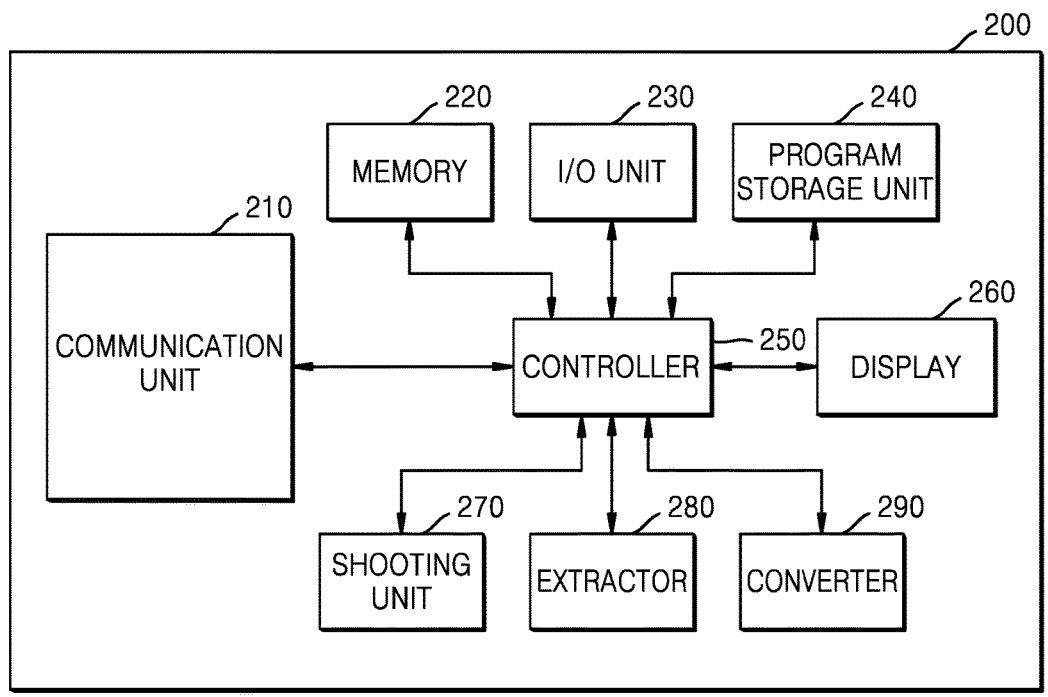
FIG. 5 is a schematic block diagram of a structure of a subdevice included in the image processing system of FIG. 1.

FIG. 5 is a schematic block diagram of a structure of the subdevice 200 included in the image processing system 1 of FIG. 1. Referring to FIG. 5, each of the first to $N^{th}$ devices 200-1 to 200-N included in the subdevice 200 may include a communication unit 210, a memory 220, an I/O unit 230, a program storage unit 240, a controller 250, a display 260, a shooting unit 270, an extractor 280, and a converter 290.

The communication unit 210 may provide a communication interface needed to provide, in the form of packet data, a signal to be exchanged between the main device 100 and the subdevice 200 while being linked to the first communication network 300. The communication unit 210 may receive a connection request signal from the main device 100, transmit a connection permission signal to the main device 100, receive a shooting start signal from the main device 100, transmit second video data to the main device 100, and transmit the second video data, the frame rate of which is converted, according to a request from the main device 100.

The communication unit 210 may be a device including hardware and software needed to connect another network device via wire or wirelessly so as to transmit a signal, such as a control signal or a data signal, to or receive the signal from the network device.

The memory 220 performs a function of temporarily or permanently storing data processed by the controller 250. In the present embodiment, the memory 220 may store a moving picture (including first video data and first audio data) captured by the subdevice 200. Here, the memory 220 may include a magnetic storage medium or a flash storage medium but the scope of the inventive concept is not limited thereto.

The I/O unit 230 may be embodied as a touch recognition display controller or any of other various I/O controllers. For example, the touch recognition display controller may provide an output interface and an input interface between a device and a user. The touch recognition display controller may transmit an electrical signal to or receive it from the controller 250. Furthermore, the touch recognition display controller displays a visual output and/or an audio output to a user. The visual output may include text, graphics, an image, video, or a combination thereof. The audio output may include audio in synchronization with the visual output. The I/O unit 130 may be, for example, a display member having a touch recognition function, such as an OLED or an LCD.

The program storage unit 240 includes control software for generating the connection permission signal and transmitting it according to the connection request signal from the main device 100, capturing a moving picture including first video data and first audio data according to a shooting start signal from the main device 100, converting the first video data included in the moving picture into second video data, converting a frame rate of the second video data according to a request from the main device 100, and so on.

The controller 250 is a type of CPU and may control a whole process of converting first video data included in a captured moving picture into second video data and transmitting the second video data to the main device 100. As described above, the controller 250 may control a whole processing process related to the exchange of data between the main device 100 and the subdevice 200.

The display 260 may reproduce a moving picture which is being captured by the subdevice 200, i.e., first video data and first audio data. Here, the display 260 may be, for example, a display member having a touch recognition function, such as an OLED or an LCD.

Although not shown, the shooting unit 270 may include a camera having a shutter, a series of lenses, an iris, and a CCD, an ADC, a microphone, etc. The shooting unit 270 may capture, from light input through a shutter, a moving picture (including first audio data and first video data) of a subject in real time at a location, which is the same as or different from a location where a subject is captured by the main device 100. The shooting unit 270 may capture the first video data by using the CCD and record the first audio data by using the microphone. The moving picture captured by the shooting unit 270 may be displayed on the display 260.

The extractor 280 may extract the first video data from the moving picture (including the first video data and first audio data) captured by the shooting unit 270, and the converter 290 may convert the first video data into second video data. Here, the converter 290 may generate second video data by converting a frame rate and/or resolution of the second video data according to a request from the main device 100. The second video data converted from the first video data by the converter 290 may be transmitted to the main device 100 via the communication unit 210 and the first communication network 300. Here, the second video data which is first transmitted to the main device 100 may have a frame rate of 15 frames per second, and may be converted into second video data having a frame rate of 30 frames per second according to the request from the main device 100 and be then transmitted to the main device 100.

Figure 6:
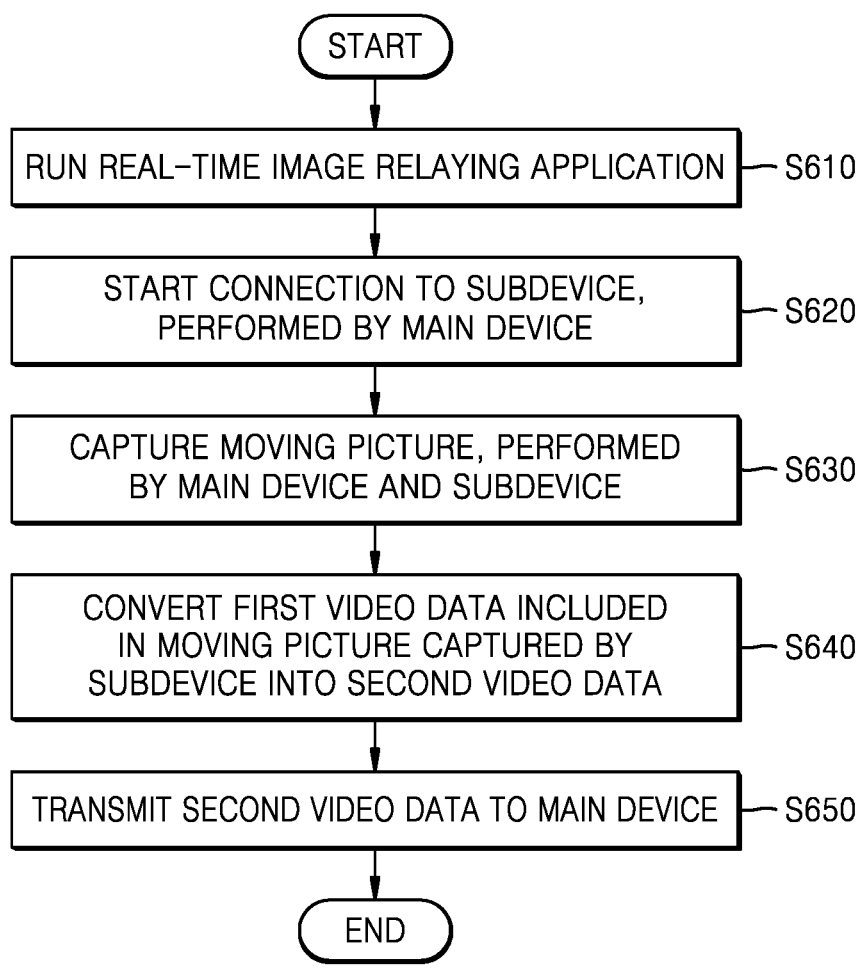
FIGS. 6 to 8 are flowcharts of image processing methods according to embodiments.

FIG. 6 is a flowchart of an image processing method according to one embodiment. In the following description, elements of the image processing method of FIG. 6 which are the same as those described above with reference to FIGS. 1 to 5 are not redundantly described here. FIG. 6 illustrates an image processing method in which data is transmitted and received between the main device 100 and the subdevice 200 via the first communication network 300, and the method is described below in terms of the subdevice 200.

Referring to FIG. 6, the main device 100 and the subdevice 200 run a real-time image relaying application according to a user's selection (operation S610).

When the running of the real-time image relaying application is completed, the main device 100 starts connection to the subdevice 200 (operation S620).

Figure 7:
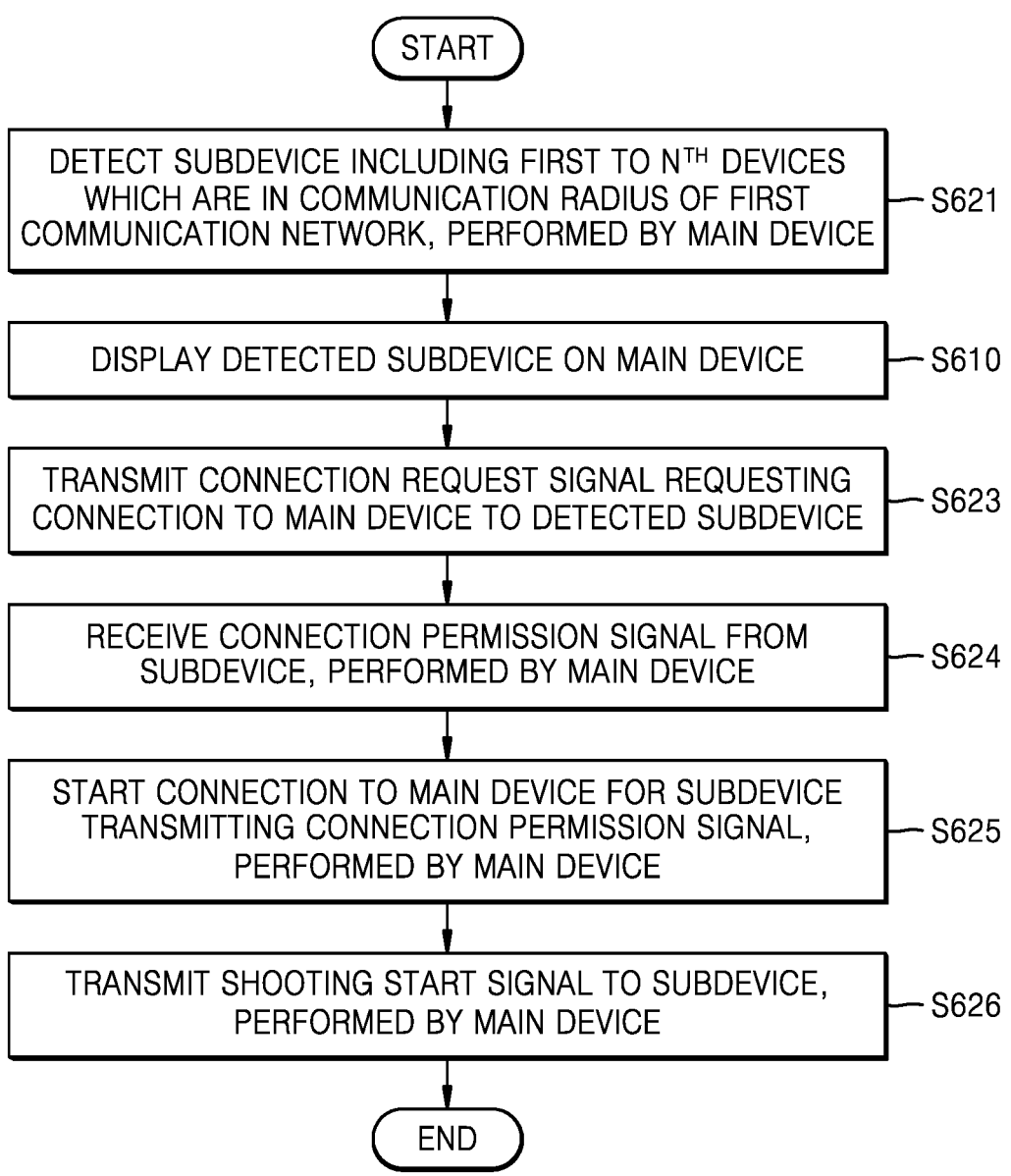

FIG. 7 is a flowchart of a method of starting connection to the subdevice 200 according to one embodiment, performed by the main device 100. Referring to FIG. 7, the main device 100 detects the first to $N^{th}$ devices 200-1 to 200-N included in the subdevice 200 which is in a communication radius of the first communication network 300 (operation S621).

The detected first to $N^{th}$ devices 200-1 to 200-N included in the subdevice 200 are displayed on the main device 100 (operation S622).

The main device 100 selects at least one device among the first to $N^{th}$ devices 200-1 to 200-N from a result of detecting the first to $N^{th}$ devices 200-1 to 200-N, and transmits a connection request signal requesting connection to the main device 100 to the at least one device (operation S623).

The main device 100 receives a connection permission signal from the at least one device to which the connection request signal is transmitted (operation S624).

The main device 100 sets connection to the main device 100 for the at least one device transmitting the connection permission signal (operation S625).

When the setting of the connection to the main device 100 is completed, the main device 100 generates a shooting start signal and transmits it to the at least one device (operation S626). Thus, same shooting start time may be recorded on the main device 100 and the at least one device.

The main device 100 may set the media platform 400 as an external device to which a moving picture (including second video data and first audio data) is to be transmitted in real time during one of operations S621 to S626 described above.

Referring back to FIG. 6, when shooting begins, each of the main device 100 and the subdevice 200 captures a moving picture in real time (operation S630). The main device 100 may capture a moving picture (including first audio data and first video data) of a subject at a location in real time. The subdevice 200 may capture a moving picture (including first audio data and first video data) of the subject in real time at a location which is the same as or different from the location where the main device 100 captures the moving picture of the subject.

The subdevice 200 converts the first video data included in the moving picture into second video data (operation S640). Here, the first video data may be raw data which is non-processed data containing data processed to a minimum level by a CCD (not shown) included in the subdevice 200. The second video data is video data obtained by converting the first video data into a predetermined format, and may contain, for example, a bitmap format. Here, the second video data is not limited to the bitmap format, and may include an image format such as a JPEG format, a GIF, a PNG format, or the like.

The subdevice 200 transmits the second video data to the main device via the first communication network 300 (operation S650). The second video data which is first transmitted from the subdevice 200 to the main device 100 may have, for example, a frame rate of 15 frames per second, and may be converted into second video data having a frame rate of 30 frames per second and be then transmitted to the main device 100 according to a request from the main device 100.

Figure 8:
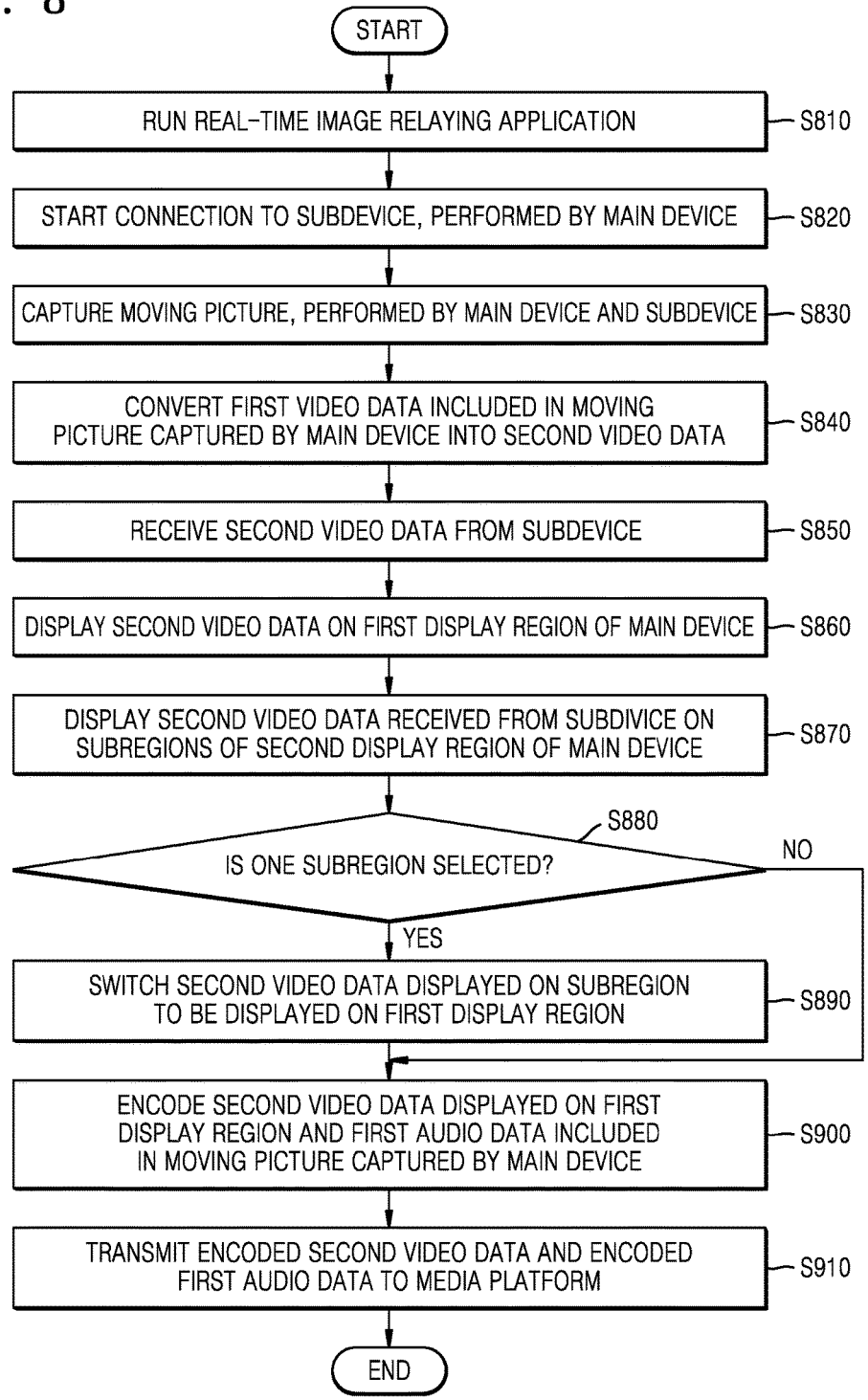

FIG. 8 is a flowchart of an image processing method according to another embodiment. In the following description, elements of the image processing method of FIG. 8 which are the same as those described above with reference to FIGS. 1 to 7 will not be redundantly described below. FIG. 8 illustrates an image processing method in which data is transmitted and received between the main device 100 and the subdevice 200 via the first communication network 300, and the method is described below in terms of the main device 100.

Referring to FIG. 8, the main device 100 and the subdevice 200 run a real-time image relaying application according to a user's selection (operation S810).

When the running of the real-time image relaying application is completed, the main device 100 starts connection to the subdevice 200 (operation S820). A method of starting connection to the subdevice 200, performed by the main device 100, is the same as that described above with reference to FIG. 7 and is thus not described again here.

When shooting is started, each of the main device 100 and the subdevice 200 captures a moving picture in real time (operation S830). The main device 100 may capture a moving picture (including first audio data and first video data) of a subject at a certain location in real time. The subdevice 200 may capture a moving picture (including first audio data and first video data) of the subject at one or more locations which are the same as or different from the location where the main device 100 captures the moving picture of the subject.

The main device 100 converts the first video data included in the moving picture into second video data (operation S840).

The main device 100 receives second video data from the first to $N^{th}$ devices 200-1 to 200-N included in the subdevice 200 which starts the capturing of the moving picture simultaneously with the capturing of the moving picture by the main device 100 (operation S850).

The main device 100 displays the second video data converted from the first video data included in the moving picture captured by the main device 100 itself on a first display region (operation S860).

The main device 100 displays the second video data received from the first to $N^{th}$ devices 200-1 to 200-N on each of a plurality of subregions of a second display region different from the first display region (operation S870).

Here, a second video signal displayed on the first display region may be transmitted to the media platform 400 in real time. Furthermore, the second video data displayed on the first display region and the second video data displayed on the plurality of subregions of the second display region may be different in a frame rate. For example, second video data having a frame rate of 30 frames per second may be displayed on the first display region, and second video data having a frame rate of 15 frames per second may be displayed on the plurality of subregions of the second display region. Since the second video data received in real time from the first to $N^{th}$ devices 200-1 to 200-N is displayed on the plurality of subregions of the second display region, the main device 100 may control a second video signal of 30 frames per second to be displayed on the first display region with respect to the main device 100 and a second video signal of 15 frames per second to be transmitted with respect to the first to $N^{th}$ devices 200-1 to 200-N, simultaneously with transmission of a shooting start signal to the first to $N^{th}$ devices 200-1 to 200-N. Thus, the second video signal of 15 frames per second received from the first to $N^{th}$ devices 200-1 to 200-N may be displayed on the plurality of subregions of the second display region.

The main device 100 determines whether a subregion among the plurality of subregions is selected by a user (operation S880).

When it is determined that a subregion is selected, the main device 100 switches second video data displayed on the selected subregion to be displayed on the first display region (operation S890). When it is determined that a subregion is not selected, the second video data converted from the first video data included in the moving picture captured by the main device 100 is displayed on the first display region.

Here, when the second video data displayed on the selected subregion is switched to be displayed on the first display region, the main device 100 may transmit a control signal instructing to transmit second video data having a different frame rate to one of the first to $N^{th}$ devices 200-1 to 200-N which transmits the second video data to the selected subregion. That is, when the subregion is selected, a control signal instructing to transmit second video data having a frame rate of 30 frames per second may be transmitted to one of the first to $N^{th}$ devices 200-1 to 200-N which previously transmitted second video data having a frame rate of 15 frames per second. Furthermore, when the main device 100 switches second video data previously displayed on the first display region to be displayed on one of the plurality of subregions of the second display region, a control signal instructing to transmit second video data having a frame rate of 30 frames per second at a frame rate of 15 frames per second may be output.

The main device 100 encodes the second video data displayed on the first display region into an H.264 format, and encodes the first audio data, which is included in the moving picture captured by the main device 100, by using AAC (operation S900). Here, even if only the second video data is received from the subdevice 200 and displayed on the first display region, the same shooting start signal is recorded on the main device 100 and the subdevice 200. Thus, the second video data received from the subdevice 200 and the first audio data recorded by the main device 100 may be synchronous or almost synchronous with each other.

The main device 100 transmits the encoded second video data displayed on the first display region and the encoded first audio data to the media platform 400 via the second communication network 500 by using the RTMP (operation S910). Thus, the moving picture (including the second video data and the first audio data) transmitted in real time from the main device 100 may be reproduced at the media platform 400.

Figure 9:
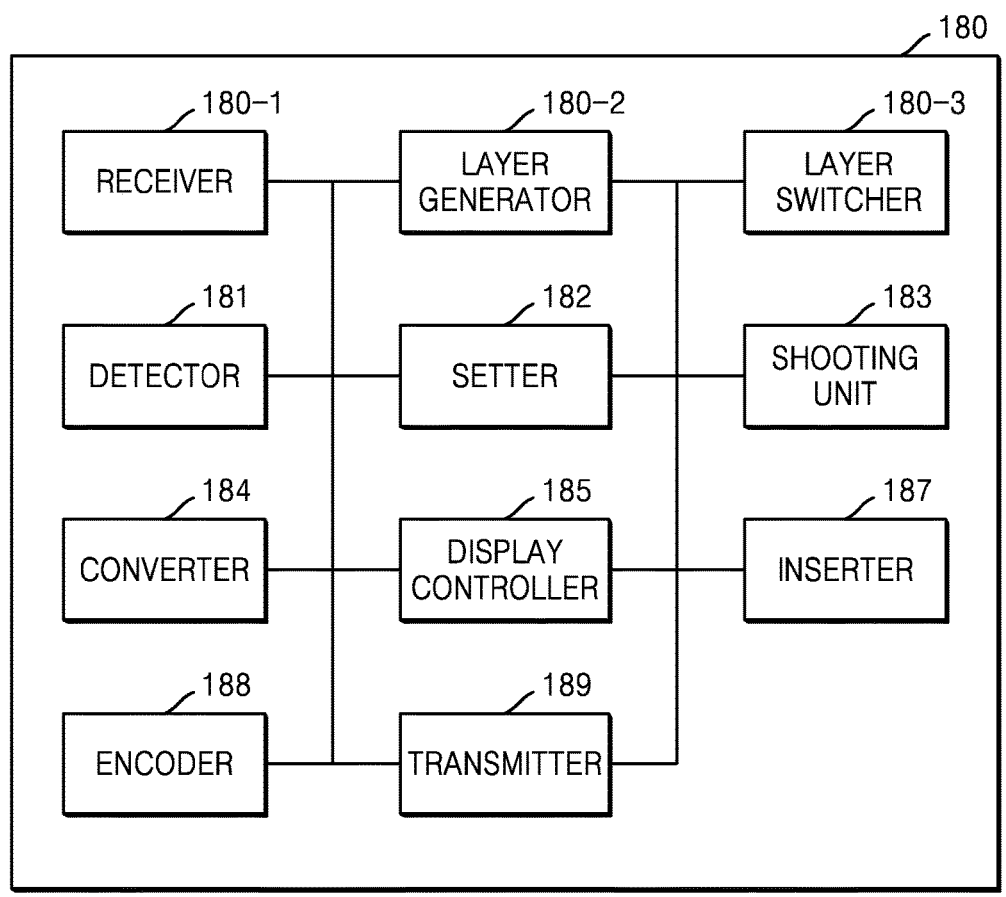
FIG. 9 is a diagram schematically illustrating a structure of an image processor of the main device of FIG. 2, according to another embodiment.

In an alternative embodiment, the main device 100 may provide a user interface for inserting a watermark in a state in which second video data is displayed on the first display region, and insert the watermark into the second video data displayed on the first display region according to a user's selection FIG. 9 is a diagram schematically illustrating a structure of the image processor 180 of the main device 100 of FIG. 2, according to another embodiment. Elements of FIG. 9 that are the same as those of FIGS. 1 to 8 will not be redundantly described here. Referring to FIG. 9, the image processor 180 may include a receiver 180-1, a layer generator 180-2, a layer switcher 180-3, a detector 181, a setter 182, a shooting unit 183, a converter 184, a display controller 185, an inserter 187, an encoder 188, and a transmitter 189.

The detector 181 may detect the first to $N^{th}$ devices 200-1 to 200-N as the subdevice 200, which are within the communication radius of the first communication network 300, and output a result of detecting the first to $N^{th}$ devices 200-1 to 200-N as the subdevice 200 to the display 170 when a signal requesting to search for the subdevice 200 is received from a user.

The setter 182 may check the result of detecting the first to $N^{th}$ devices 200-1 to 200-N as the subdevice 200, select at least one from among the first to $N^{th}$ devices 200-1 to 200-N from the detection result, and transmit a connection request signal requesting to connect to the main device 100 to the selected at least one device. When receiving a connection permission signal from the selected at least one device to which the connection request signal is transmitted, the setter 182 may display the selected at least one device transmitting the connection permission signal on the display 170, and may start connection to the main device 100 according to a selection signal with respect to the selected at least one device.

The setter 182 may set the media platform 400 as an external device to which a moving picture (including second video data and first audio data) is to be transmitted in real time during the detecting of the first to $N^{th}$ devices 200-1 to 200-N or the starting of the connection to the main device 100. When the setter 182 completes setting of the starting of the connection to the main device 100, a shooting start signal may be generated and transmitted to the first to $N^{th}$ devices 200-1 to 200-N and thus the same shooting start time may be recorded on the main device 100 and the first to $N^{th}$ devices 200-1 to 200-N.

Although not shown, the shooting unit 183 may include a camera having a shutter, a series of lenses, an iris, and a CCD, an ADC, a microphone, etc. The shooting unit 183 may capture, through the shutter, a moving picture including first audio data and first video data of a subject at a certain location in real time. The shooting unit 183 may capture the first video data by using the CCD and record the first audio data by using the microphone.

The converter 184 may convert the first video data captured in real time into second video data. Here, the first video data may be raw data including data processed to a minimum level by the CCD included in the shooting unit 183. The second video data may include video data obtained by converting the first video data to a certain format, e.g., data in a bitmap format. Furthermore, the converter 184 may generate second video data by converting a frame rate and/or resolution of the first video data according to a control signal.

The receiver 180-1 may receive second video data converted from first video data of a moving picture including the first video data and first audio data of a subject except the first audio data, the moving picture being captured at the same shooting start time as the shooting unit 183, and at one or more positions which are different from a shooting position of the shooting unit 183 by the subdevice 200 transmitting the connection permission signal, i.e., at least one among the first to $N^{th}$ devices 200-1 to 200-N.

The layer generator 180-2 may generate a first layer and at least one second layer on a screen of the display 170 to reproduce and display on one screen a plurality of pieces of second video data including the second video data captured by the shooting unit 183 and converted by the converter 184 and at least one piece of second video data received by the receiver 180-1. Here, the first layer may include, for example, a whole screen on a region of the display 170, and the at least one second layer may include a screen which is smaller than the whole screen and located on a certain location on the whole screen, although the second layer is reproduced and displayed together with the whole screen. For example, the first layer may correspond to the first display region described above and the second layer may correspond to the second display region described above. In the present embodiment, the second display region corresponding to the second layer is not a region separated from the first display region, but may be included in the first display region.

Figure 10:
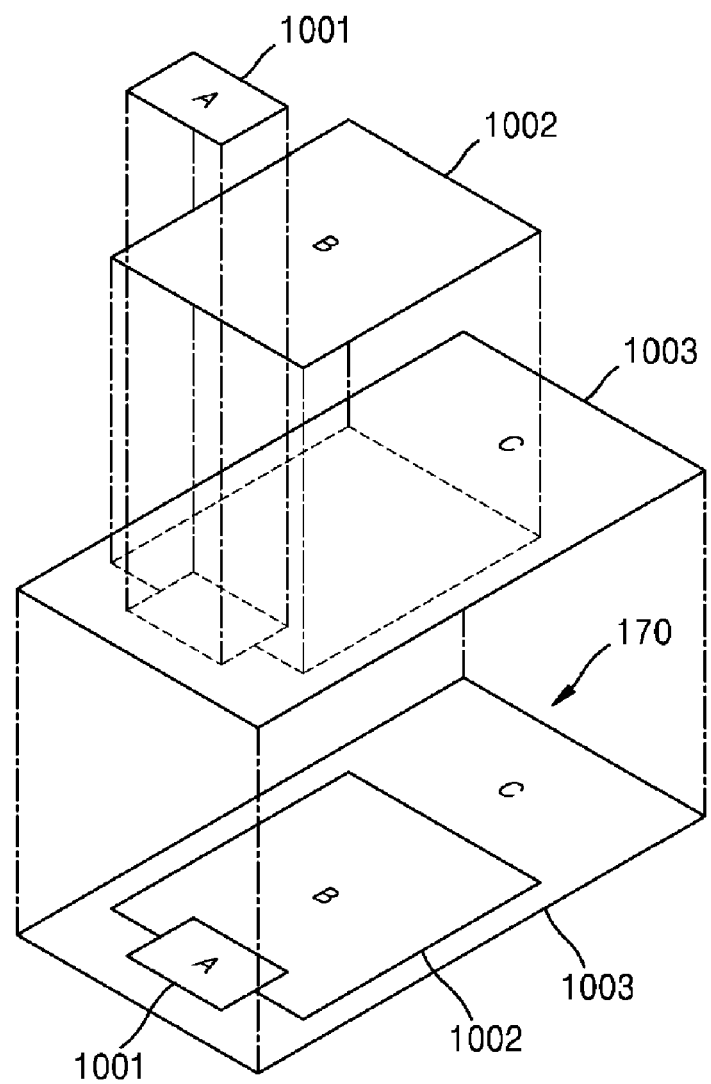
FIGS. 10 to 11B are diagrams schematically illustrating examples of a structure of a display of a main device of FIG. 1, according to other embodiments.

FIG. 10 is a diagram illustrating generation of a layer according to an embodiment. Referring to FIG. 10, the main device 100 may classify various types of information or data according to an appropriate condition to display the various types of information or data on one screen, and generate layers representing the classified information or data. The information or data may be transmitted to the generated layers and then the layers may be hierarchically combined to form one screen and be output to the display 170. The screen may include at least one layer. Each of the at least one layer may be the same or different in size, location, etc. FIG. 10 illustrates that a layer A 1001, a layer B 1002, and a layer C 1003 are combined with one another, i.e., they are overlaid with one another, to finally form one screen on the display 170. Here, different data is displayed on the layers.

Figure 11A:
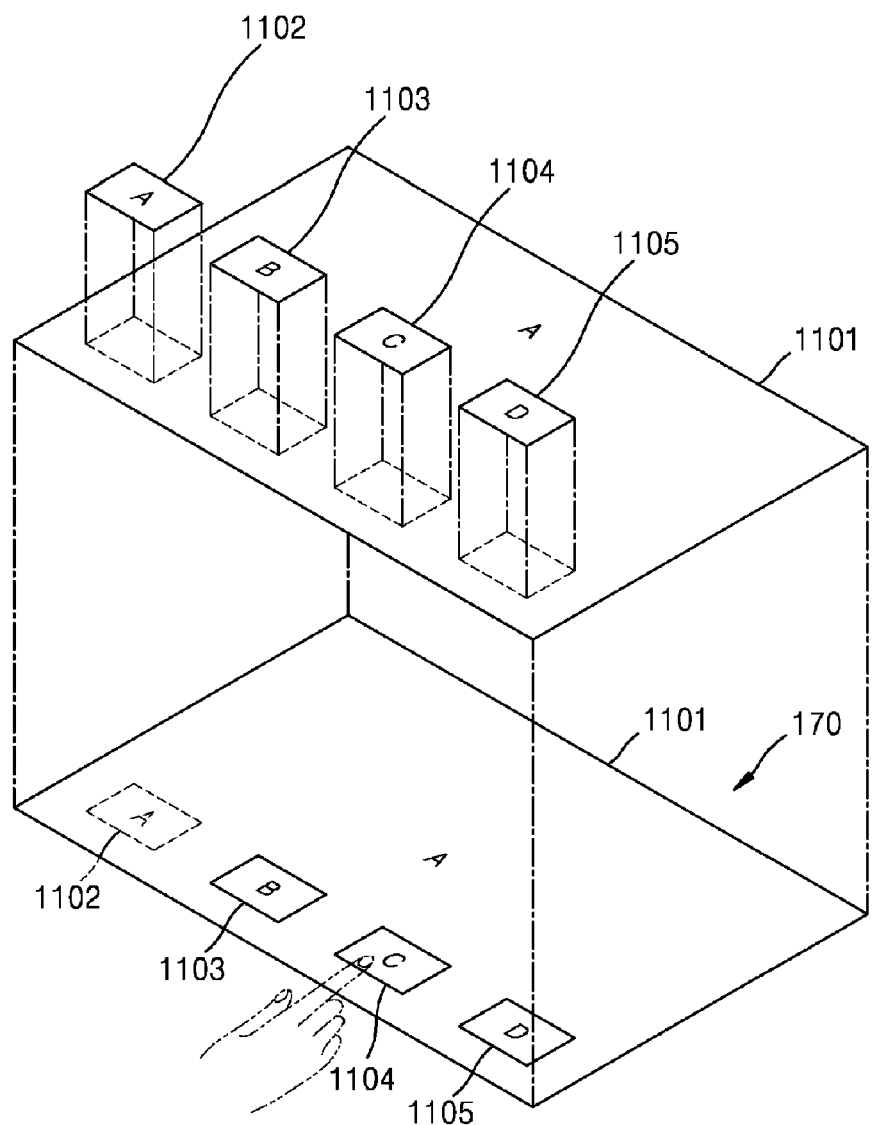
Figure 11B:
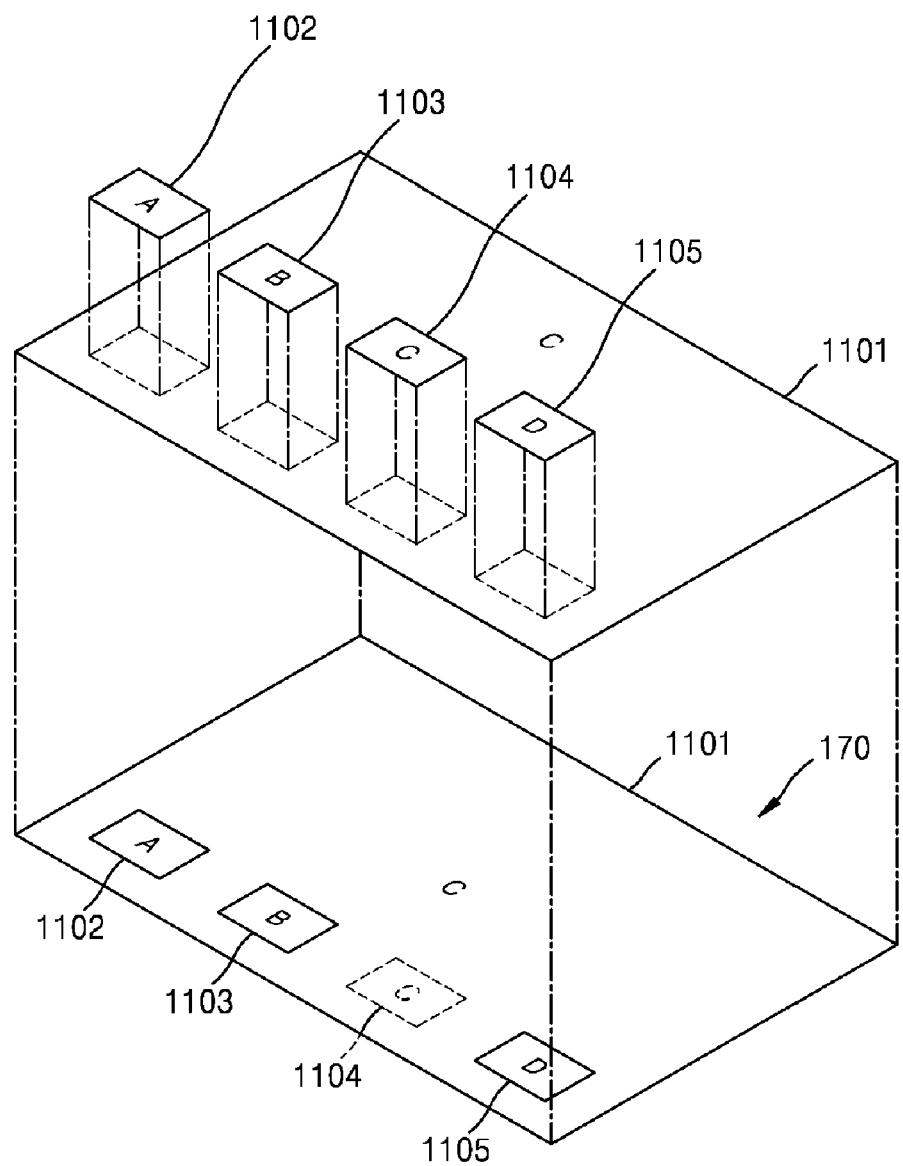

FIGS. 11A and 11B are diagrams schematically illustrating examples of a structure of the display 170 of the main device 100 of FIG. 1, according to other embodiments. Referring to FIGS. 10 and 11A, a layer generator 180-2 may generate a first layer 1101 and at least one from among second layers 1102, 1103, 1104, and 1105, to reproduce and display on one screen a plurality of pieces of second video data including second video data captured by the main device 100 and one or more pieces of second video data received from the subdevice 200. One of the plurality of pieces of second video data may be transmitted to the first layer 1101. For example, second video data A captured by the main device 100 may be transmitted to the first layer 1101. The plurality of pieces of second data may be transmitted to the at least one from among the second layers 1102, 1103, 1104, and 1105. For example, the second video data A captured by the main device 100 and at least one piece of second video data, e.g., second video data B, C, and D, received from the subdevice 200 transmitting a connection permission signal may be transmitted to the at least one from among the second layers 1102, 1103, 1104, and 1105. Here, the number of the at least one from among the second layers 1102, 1103, 1104, and 1105 may be equal to the sum of the number of the first to $N^{th}$ devices 200-1 to 200-N transmitting the connection permission signal (i.e., 3 corresponding to the second video data B, C, and D) and the number of the main device 100 (i.e., 1 corresponding to the second video data A). The sum of the number of the first layer 1101 and the number of the at least one from among the second layers 1102 to 1105 may be greater by 1 than the sum of the number of the first to $N^{th}$ devices 200-1 to 200-N transmitting the connection permission signal and the number of the main device 100.

The display controller 185 may reproduce and display the first layer 1101 (the second video data A) and the at least one from among the second layers 1102, 1103, 1104, and 1105 (the second video data A, B, C, and D) on one screen of the display 170 to be overlaid with each other through hierarchical combining, and may perform blocking on the second layer 1102 corresponding to the first layer 1101. Here, the performing of the blocking on the second layer 1102 may be understood as processing the second layer 1102 (the second video data A) corresponding to the first layer 1101 to be transparent so that a corresponding hidden portion of the first layer 1101 (the second video data A) may be visualized. Thus, as illustrated in FIG. 11A, the first layer 1101 (the second video data A) and the three second layers 1103, 1104, and 1105 (the second video data B, C, and D) are reproduced and displayed on the display 170.

In an alternative embodiment, the display controller 185 may control a moving picture capturing state of the shooting unit 183 to be maintained when the first layer 1101 (the second video data A) and the at least one from among the second layers 1102, 1103, 1104, and 1105 (the second video data A, B, C, and D) are hierarchically combined to be overlaid with each other on one screen of the display 170.

Conventionally, when receiving one or more pieces of second video data from the subdevice 200, the main device 100 hardware-codes and displays the one or more pieces of the second video data. Thus, a video capturing function of the main device 100, i.e., an operation of a camera, should be stopped in this process. In contrast, in the present embodiment, the main device 100 does not additionally perform hardware coding but performs software coding, and generates a plurality of independent layers to reproduce and display one or more pieces of second video data received from the subdevice 200. Accordingly, the video capturing function of the main device 100, i.e., the operation of the camera, may be maintained.

As described above, the main device 100 generates a plurality of layers, and the camera of the main device 100 is turned on to continuously capture a moving picture while one or more pieces of second video data from the subdevice 200 are reproduced and displayed. Thus, even if second video data cannot be received from the subdevice 200 due to an error occurring in the first communication network 300, second video data and first audio data captured by the main device 100 may be relayed in real time to the media platform 400 and thus be reproduced in real time at the media platform 400.

When a screen switch event signal regarding one of the at least one second layer is received, the layer switcher 180-3 may switch the second layer to the first layer and switch the first layer which has yet to be switched to the second layer. When a screen switch event signal regarding the first layer 1101 (the second video data A) and one (e.g., the second layer 1104 (the second video data C)) among the at least one second layer 1103, 1104, and 1105 (the second video data B, C, and D) reproduced and displayed on the display 170 of the main device 100 is received as illustrated in FIG. 11A, the layer switcher 180-3 may switch the second layer 1104 (the second video data C) to the first layer 1101 (the second video data C) and switch the first layer 1101 (the second video data A) which has yet to be switched to the second layer 1102 (the second video data A) as illustrated in FIG. 11B.

The display controller 185 may synthesize, reproduce and display the first layer 1101 (the second video data C) and the second layer 1102, 1103, and 1105 (the second video data A, B, and D) as one screen after performing switching through hierarchical combining, and perform blocking on the second layer 1104 (the second video data C) corresponding to the first layer 1101 (the second video data C).

The display controller 185 may control the second video data reproduced and displayed on the first layer 1101 (indicated by reference numeral A in FIG. 11A or reference numeral C in FIG. 11B; hereinafter referred to as the "second video data A") to be transmitted in real time to the media platform 400. The second video data A reproduced and displayed on the first layer 1101, and the second video data (indicated by reference numerals B, C, and D in FIG. 11A or reference numerals A, B, and D in FIG. 11B; hereinafter referred to as the second video data B, C, and D) reproduced and displayed on the at least one second layer (indicated by reference numerals 1103, 1104, and 1105 in FIG. 11A or reference numerals 1102, 1103, and 1105 in FIG. 11B; hereinafter referred to as the at least one second layer 1103, 1104, and 1105) may be different in terms of frame rate. For example, the second video data A of 30 frames per second may be reproduced and displayed on the first layer 1101, and the second video data B, C, and D of 15 frames per second may be reproduced and displayed on the second layers 1103, 1104, and 1105. As illustrated in FIG. 11A, the second layers 1103, 1104, and 1105 included in one screen of the display 170 are smaller in size than the first layer 1101 and thus an error does not occur during the reproducing and displaying thereof even when the frame rates of the second layers 1103, 1104, and 1105 are lower than that of the first layer 1101.

Since the second video data B, C, and D received in real time from the first to N$^{th}$ devices 200-1 to 200-N are reproduced and displayed on the second layers 1103, 1104, and 1105, the display controller 185 may control the main device 100 to reproduce and display the second video data A of 30 frames per second on the first layer 1101 and control the first to N$^{th}$ devices 200-1 to 200-N to transmit the second video data B, C, and D of 15 frames per second as soon as a shooting start signal is transmitted to the first to N$^{th}$ devices 200-1 to 200-N. Accordingly, the second video data B, C, and D of 15 frames per second received from the first to N$^{th}$ devices 200-1 to 200-N may be reproduced and displayed on the second layers 1103, 1104, and 1105.

The second video data A reproduced and displayed on the first layer 1101 and the second video data B, C, and D reproduced and displayed on the second layers 1103, 1104, and 1105 are different in frame rate in the present embodiment, but may be different in resolution. For example, the display controller 185 may display the second video data A having a resolution of 1280×720 on the first layer 1101 and may display second video data B, C, and D having a resolution of 640×480 on the second layers 1103, 1104, and 1105.

When a piece of second video data, e.g., the second video data C, among the second video data B, C, and D reproduced and displayed on the second layers 1103, 1104, and 1105 is switched to the first layer 1101, the layer switcher 180-3 may transmit a control signal to one of the first to N$^{th}$ devices 200-1 to 200-N, which transmit the second video data C to the second layer 1104, to transmit the second video data C, the frame rate of which is changed. That is, a control signal instructing to transmit the second video data C having a frame rate of 30 frames per second may be transmitted to one of the first to N$^{th}$ devices 200-1 to 200-N transmitting the second video data C having a frame rate of 15 frames per second when a screen switch event signal is received.

Furthermore, when the second video data A reproduced and displayed on the first layer 1101 is switched to the second layer 1102, the layer switcher 180-3 may output a control signal instructing to transmit the second video data A having a frame rate of 15 frames per second rather than the second video data A having a frame rate of 30 frames per second.

The inserter 187 may provide a user interface for inserting a watermark while the second video data A is reproduced and displayed on the first layer 1101, and insert the watermark into the second video data A displayed on the first layer 1101 according to a user's selection. Here, the watermark may include various graphic elements such as an image, subtitles, a visual effect, etc.

The encoder 188 may encode the second video data A reproduced and displayed on the first layer 1101 into the H.264 format and encode the first audio data through AAC. Here, even if only second video data is received from the subdevice 200 and displayed on the first layer 1101, the same shooting start signal is recorded on the main device 100 and the subdevice 200 and thus the second video data received from the subdevice 200 and the first audio data recorded by the main device 100 may be synchronous or almost synchronous with each other.

The transmitter 189 may transmit the encoded second video data displayed on the first layer 1101 and the encoded first audio data to the media platform 400 via the second communication network 500 using the RTMP. Thus, a moving picture (including the second video data and the first audio data) transmitted in real time from the main device 100 may be reproduced at the media platform 400.

FIG. 12 is a flowchart of a method of processing an image, according to another embodiment. Elements of FIG. 12 that are the same as those of FIGS. 1 to 11B are not redundantly described here. FIG. 12 illustrates an image processing method in which data is transmitted and received between the main device 100 and the subdevice 200 via the first communication network 300, the method being described below in terms of the main device 100.

Referring to FIG. 12, the main device 100 and the subdevice 200 run a real-time image relaying application according to a user's selection (operation S1201).

When the running of the real-time image relaying application is completed, the main device 100 starts connection to the subdevice 200 (operation S1203). A method of starting connection to the subdevice 200, performed by the main device 100, is the same as that described above with reference to FIG. 7 and is thus not described again here.

When shooting is started, each of the main device 100 and the subdevice 200 captures a moving picture in real time (operation S1205). The main device 100 may capture a moving picture (including first audio data and first video data) of a subject at a certain location in real time. The subdevice 200 may capture a moving picture (including first audio data and first video data) of the subject at one or more locations which are the same as or different from the location where the main device 100 captures the moving picture of the subject.

The main device 100 converts the first video data of the moving picture captured by the main device 100 itself into second video data (operation S1207).

The main device 100 receives second video data from the first to N$^{th}$ devices 200-1 to 200-N of the subdevice 200 which starts the capturing of the moving picture simultaneously with the capturing of the moving picture by the main device 100 (operation S1209).

The main device 100 generates a first layer and at least one second layer (operation S1211). In order to reproduce and display on one screen a plurality of pieces of second data including the second video data captured by the main device 100 itself and one or more pieces of second video data received from the subdevice 200, the main device 100 may transmit one of the plurality of pieces of second data to the first layer and transmit the plurality of pieces of second data to the at least one second layer.

The main device 100 reproduces and displays the first layer and the at least one second layer by hierarchically combining them to be overlaid with each other on the screen (operation S1213). Here, the main device 100 may control a moving picture capturing state of the shooting unit 183 to be maintained when the first layer and the at least one second layer are reproduced and displayed to be overlaid with each other on one screen of the display through hierarchical combining.

The main device 100 performs blocking on the second layer corresponding to the first layer on the screen on which reproduction and displaying are being performed (operation S1215).

The main device 100 encodes the second video data displayed on the first layer into the H.264 format, and encodes the first audio data of the moving picture captured by the main device 100 through AAC (operation S1217). Here, even if only the second video data is received from the subdevice 200 and displayed on the first layer, the same shooting start signal is recorded on the main device 100 and the subdevice 200. Thus, the second video data received from the subdevice 200 and the first audio data recorded by the main device 100 may be synchronous or almost synchronous with each other.

The main device 100 transmits the encoded second video data displayed on the first layer and the encoded first audio data to the media platform 400 via the second communication network 500 by using the RTMP (operation S1219). Thus, the moving picture (including the second video data and the first audio data) transmitted in real time from the main device 100 may be reproduced at the media platform 400.

The main device 100 determines whether a screen switch event signal regarding the first layer and one of the at least one second layer reproduced and displayed on the display 170 of the main device 100 is received (operation S1221).

When the main device 100 receives the screen switch event signal, the second layer is switched to the first layer and the first layer which has yet to be switched is switched to the second layer (operation S1223). Thereafter, the main device 100 may synthesize, reproduce and display the first layer and the at least one second layer as one screen after performing switching through hierarchical combining, and perform blocking the second layer corresponding to the first layer after performing switching.

According to one or more of the above embodiments, video data and audio data captured by multiple devices may be transmitted to a media platform in real time without delay and thus the video data and the audio data can be reproduced at the media platform in real time.

A video signal captured by a subdevice among the multiple devices may be transmitted to a main device without delay and without using a router, and the main device may relay video data and audio data to the media platform in real time and the video data and the audio data in real time can be reproduced in real time at the media platform.

Video signals captured by the main device and the subdevice may be displayed on a display region of the main device in real time to quickly determine video data to be transmitted to the media platform. Thus, the video data and audio data can be reproduced at the media platform in real time.

In addition, a camera of the main device may be turned on to continuously capture a moving picture and thus video data and audio data captured by the main device may be relayed in real time to the media platform even when video data cannot be received due to an error occurring in a communication network main device. Accordingly, the video data and the audio data can be reproduced in real time on the media platform.

Effects of the inventive concept are not, however, limited to the above effects and other effects would be apparent to those of ordinary skill in the art from the above description.

The above-described embodiments may be embodied as a computer program that can be run through a computer using various elements. The computer program may be recorded on a non-transitory computer-readable recording medium. Examples of the non-transitory computer-readable recording medium may include a magnetic recording medium such as a hard disc, a floppy disk, a magnetic tape, etc., an optical recording medium such as a CD-ROM or a DVD, a magneto-optical medium such as a flopical disk, and a hardware device specifically configured to store and execute program commands, such as a ROM, a RAM, a flash memory, etc.

The computer program may be specially designed and configured for the inventive concept or may be well-known and available to those of ordinary skill in the computer software field. Examples of the computer program may include not only machine language codes prepared by a compiler, but also high-level language codes executable by a computer by using an interpreter.

In the present disclosure, the term "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein.

The operations of all methods described herein can be performed in an appropriate order unless otherwise indicated herein or otherwise clearly contradicted by context. The inventive concept is not limited by an order in which the operations are described herein. The use of any and all examples, or exemplary language (e.g., "such as") provided herein, is intended merely to clearly describe the inventive concept and does not pose a limitation on the scope of the inventive concept unless otherwise claimed. Numerous modifications and adaptations will be readily apparent to those skilled in this art without departing from the spirit and scope of the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An apparatus for processing an image, the apparatus comprising a processor configured to:
   capture, by a shooting device including a camera having a shutter, a first moving picture including video data and audio data of a subject at a shooting location;
   receive video data of a second moving picture of the subject without audio data of the second moving picture, the second moving picture being captured by at least one sub-device at a same shooting start time as the shooting device and at one or more locations different from the shooting location of the shooting device;
   generate a first layer and at least one second layer to reproduce and display on a screen a plurality of pieces of video data including the video data captured by the shooting device and the video data captured by the at least one sub-device, wherein the first layer is configured to transmit one of the plurality of pieces of video data to the screen, and the at least one second layer is configured to transmit the plurality of pieces of video data to a part of the screen;

reproduce and display the first layer and the at least one second layer to be overlaid with each other on the screen; and transmit the video data reproduced and displayed on the first layer and the audio data included in the first moving picture captured by the shooting device to an outside, wherein, when the video data transmitted to the first layer is transmitted to one of the at least one second layer, the one of the at least one second layer turns transparent so that a portion of the first layer hidden by the one of the at least one second layer is visualized.

2. The apparatus of claim 1, wherein the processor is further configured to switch the at least one second layer to the first layer and switch the first layer which has yet to be switched to the at least one second layer, when a screen switch event signal regarding one of the at least one second layer is received.

3. The apparatus of claim 1, wherein the capturing of the first moving picture by the shooting device is continuously performed.

4. A method of processing an image, the method comprising:

capturing, by a shooting device including a camera having a shutter, a first moving picture including video data and audio data of a subject at a shooting location;

receiving video data of a second moving picture of the subject without audio data of the second moving picture, the second moving picture being captured by at least one sub-device at a same shooting start time as the shooting device and at one or more locations different from the shooting location of the shooting device;

generating a first layer and at least one second layer to reproduce and display on a screen a plurality of pieces of video data including the video data captured by the shooting device and the video data captured by the at least one sub-device, wherein the first layer is configured to transmit one of the plurality of pieces of video data to the screen, and the at least one second layer is configured to transmit the plurality of pieces of video data to a part of the screen;

reproducing and displaying the first layer and the at least one second layer to be overlaid with each other on the screen; and transmitting the video data reproduced and displayed on the first layer and the audio data included in the first moving picture captured by the shooting device to an outside, wherein when the video data transmitted to the first layer is transmitted to one of the at least one second layer, the at least one second layer turns transparent so that a portion of the first layer hidden by the one of the at least one second layer is visualized.

5. The method of claim 4, further comprising switching the at least one second layer to the first layer and switching the first layer which has yet to be switched to the at least one second layer, when a screen switch event signal regarding one of the at least one second layer is received.

6. The method of claim 4, further comprising continuously performing the capturing of the first moving picture by the shooting device.

7. A non-transitory computer-readable recording medium having recorded thereon a computer program for performing the method of claim 4 by using a computer.

* * * * *